United States Patent [19]

Closson, Jr.

[11] 4,115,612
[45] * Sep. 19, 1978

[54] LAMINATED THERMOPLASTIC COUNTER STIFFENER

[76] Inventor: Addison W. Closson, Jr., 41 Concord Ave., Cambridge, Mass. 02138

[*] Notice: The portion of the term of this patent subsequent to Jul. 1, 1992, has been disclaimed.

[21] Appl. No.: 682,993

[22] Filed: May 4, 1976

[51] Int. Cl.² .................. B32B 3/30; B32B 27/08; B32B 31/30; A43D 21/00
[52] U.S. Cl. ......................................... 428/172; 36/68; 156/219; 156/242; 260/827; 264/241; 264/244; 427/280; 427/387; 428/151; 428/321; 428/451; 428/904

[58] Field of Search ............. 428/151, 904, 172, 451, 428/158, 159, 304, 320, 321; 156/61, 209, 210, 242, 246, 61, 244; 260/827; 36/44, 68, 77 M; 264/241, 244; 427/271, 280, 387

[56] References Cited

U.S. PATENT DOCUMENTS

| 3,646,155 | 2/1972 | Scott .............................. 260/827 |
| 3,892,078 | 7/1975 | Closson, Jr. ..................... 156/244 |

*Primary Examiner*—Stanley S. Silverman
*Attorney, Agent, or Firm*—Thompson, Birch, Gauthier & Samuels

[57] ABSTRACT

A counter stiffener for shoes is made from a thermoplastic base sheet, specifically a copolymer of ethylene and a vinyl monomer, laminated to a liner sheet. The liner sheet is a cross-linked copolymer of ethylene and a silane to which color has been added. The liner sheet is colorfast and wear-resistant.

9 Claims, 2 Drawing Figures

LAMINATED THERMOPLASTIC COUNTER STIFFENER

BACKGROUND OF THE INVENTION

Shoe construction normally includes the use of a counter stiffener to hold the back of the shoe up. The counter also functions to help hold the shoe on the foot, lend support to the wearer's heel and foot, and give the shoe an attractive shape. In the last twenty years, it has become common practice in the shoe manufacturing process to form the counter area or back part of the shoe with specially designed thermoforming machinery using a thermoplastic counter stiffener. This molding process is known as lasting.

Prior to lasting, these counter stiffeners are either inserted in a pocket between the lining and the upper of the shoe or they incorporate a surface which is also the lining of the shoe, in which case the counter stiffener with the lining surface is stitched into the quarter area of the shoe which holds it in place before molding and/or lasting.

The surface applied to the counter stiffener varies with the particular industry. In the canvas footwear industry, typically 52"-220 drills or a coated osnaburg is used. In the conventional manufacturing footwear industry, nylon flock surfaces are used with low quality footwear and nonwoven fabrics such as needle-punched polyester saturated with nitrile rubber are used with high quality footwear.

These conventional counter stiffeners employing different types of fabrics or simulated surfaces are often not easy to work, are relatively expensive, do not wear exceptionally well, and cannot be easily modified to provide a variety of distinct surfaces and colors. Attempts to laminate cross-linked thermoplastic lining surfaces to the counter stiffeners have not met with success because with a peroxide cross-linking system or an irradiation system the color varies considerably during and after the cross-linking step.

Accordingly, there exists a need for a surface for counter stiffeners and a method for providing surfaces for counter stiffeners wherein high wear factors are possible, ease of cutting and shaping is achieved during forming and molding and, more importantly, where a variety of stable colors and effects may be imparted to the surfaces.

SUMMARY OF THE INVENTION

The present invention provides a method of making a lining surface for a counter stiffener and the surfaced counter stiffener laminate. The surface may have a simulated appearance such as of grain leather, cloth, suede, etc. The surface may be of a variety of colors and it has excellent resistance to abrasion and wear. Further, the material is easily cut and shaped and when combined with the counter stiffener, the surface can withstand the heat experienced during the lasting process.

My invention broadly comprises a method of making a laminated film having a thermoplastic base sheet and a cross-linked liner sheet laminated thereto. The outer surface of the liner sheet is patterned and/or colored; and the thickness of the liner sheet relative to the base sheet is such that the physical properties of the base sheet, particularly in regard to molding, shaping and durability are not substantially affected by the liner sheet.

A preferred embodiment of my invention comprises forming a liner sheet from a polyolefin, such as polyethylene and copolymers of polyethylene with a minor proportion (less than 50% by weight) propylene, vinyl acetate and/or ethyl acrylate; and a silane such as disclosed in U.S. Pat. No. 3,646,155, which patent is hereby incorporated by reference in its entirety in this application.

One surface of the liner sheet is patterned and/or colored. This pattern may be effected by the use of an embossing roll or a pre-embossed casting release paper. The color is imparted by the addition of color additives suitable for any polyolefin system.

The liner sheet and the base sheet are bonded together to form a laminate. In the liner sheet, the silane monomer is cross-linked to the polyolefin. This results in a laminate, one ply of which is a cross-linked olefinic sheet which has a patterned, colorfast outer surface, and the other ply of which is a thermoplastic olefinic moldable counter stiffener. The laminate may be easily cut, shaped and molded.

In the preferred embodiment of the invention, a counter stiffener for footwear is formed from the laminate.

DESCRIPTION OF THE PREFERRED EMBODIMENT

Figure 1:
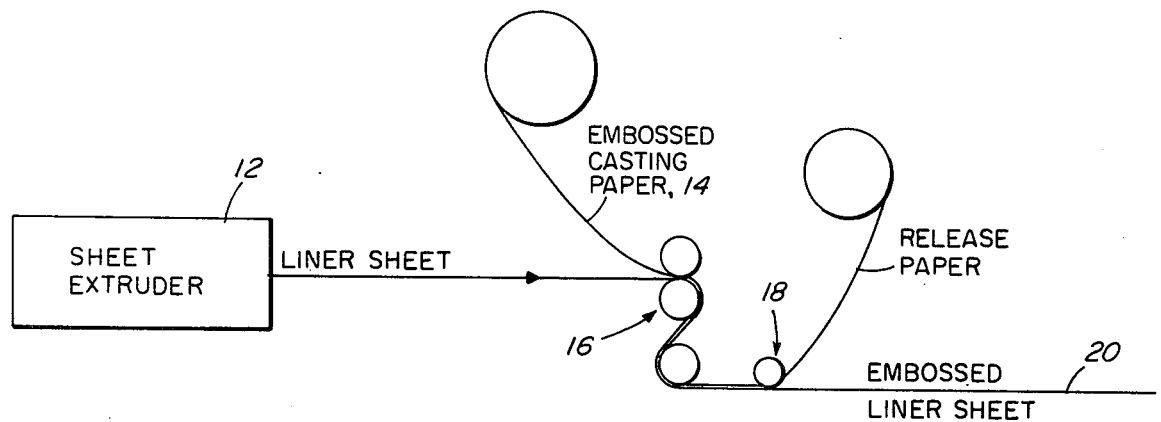
FIGS. 1 and 2 are a flow diagram of a process embodying the invention.
Figure 2:
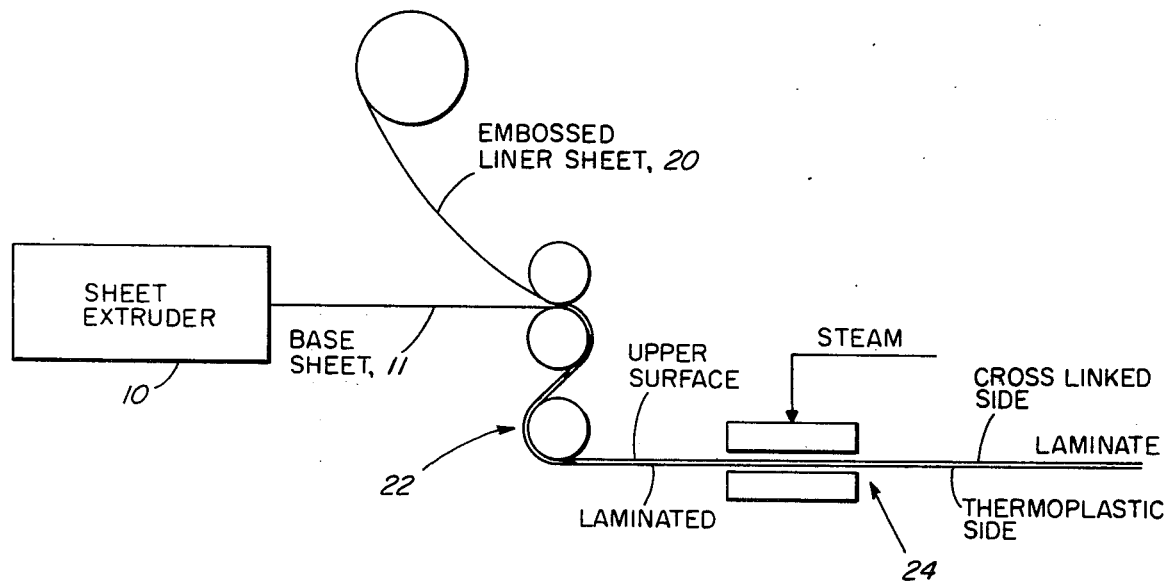

The preferred embodiment will be described in reference to counter stiffeners and the method of making the same. It is to be understood that the invention may be used in any area where it is desired to have a basically thermoplastic sheet material with a cross-linked surface exposed to wear, which surface will hold a variety of colors and/or patterns such as carpet surface for indoor or outdoor use, automobile tops, etc.

Referring to the drawing, a base sheet is extruded from a sheet extruder 10 at a thickness of about 10 to 90 mills and at a temperature of between about 320° to 380° F., preferably about 350° F. The material used for the base sheet is referred to as counter material. Ethylene vinyl acetate, ethylene ethyl acrylate and ethyl based ionomers either alone or in combination are successfully used. The sheet material has a melt index of between about 0.3 to 10.0, preferably between 0.7 to 1.2. Preferably, an ionomer such as available from E. I. du Pont deNemours & Co. and identified as Surlyn $A^R$ 1707, 1706, or 1601. is used.

The basic material of the liner sheet is a polyethylene and/or ethylene copolymer combination. As described in U.S. Pat. No. 3,646,155, a polyethylene or ethylene copolymer may be cross-linked with a silane when subjected to moisture and heat in the presence of a suitable catalyst. In this embodiment, a low density modified polyethylene (silylated ethylene) available from Dow Corning and identified as Silopas E231 is used. Briefly, a peroxide such as dicumyl oxide is dry-blended with polyethylene and vinyl silane and a condensation reaction is effected as described in the aforementioned patent. Silane when mixed with polyethylene or ethylene copolymers as taught in the patent are referred to as silylated ethylenes. The specific silylated ethylene (vinyl silane polyethylene) may be blended with a total from 70 to 0 parts by weight of polyethylene and/or ethylene copolymers such as ethylene ethyl acrylate (EEA) preferably 18% ethyl acrylate available from Union Carbide #6169, ethylene vinyl acetate (EVA), preferably 12% vinyl acetate available from Union Carbide #208, or any combination thereof.

Sixty-seven parts by weight of low density modified polyethylene, e.g., Silopas E231, is blended with 33 parts by weight of ethylene vinyl acetate, Union Carbide #208, in a twin screw extruder. A silanol condensation catalyst, specifically an organic tin compound, dibutytin dilaurate is added on the basis of 0.05% by weight of the total blend. The material is colored by adding color concentrates at 1% to 2% based on total weight. These color concentrates ar well known in the industry and are specific for polyethylene based systems. This blended material is placed in a sheet extruder 12 and extruded at a thickness of between about 2 to 30 mills, preferably between 3 to 20 mills, and at a temperature of between about 330° to 360° F.

Referring to the drawing, a pre-embossed casting release paper 14 such as avilable from S. D. Warren Company, Scott Paper and identified as Vel-Mat release paper is superimposed on the liner sheet by the roller assembly 16. The release paper is removed at 18 leaving an embossed liner sheet 20. If desired, an embossing roll may be used at the nip rolls of the extruder 12 to impart the desired pattern to the liner sheet. The now-colored and embossed liner sheet may be stored in a substantially anhydrous environment, to prevent cross-linking, or be laminated as part of a continuous process to the base sheet 11.

A base sheet 11 comprising an ionomer, specifically ionically-modified polyethylene Surlyn $A^R$ 1707 at between about 320° to 380° F. is laminated to the embossed liner sheet 20 in a pressure roller assembly 22. Since both the base and liner sheets are basically olefinic thermoplastics, they are bonded together at their contacting surfaces to form a laminate or counter stiffener having an embossed colored surface. The laminate at between 180° to 200° F. enters a steam chamber 24 and is contacted with steam at atmospheric pressure for approximately 1 to 3 minutes. This initiates the cross-linking of the polyethylene or ethylene copolymer with the silane. This laminate is cooled and rolled or sheeted. The cross-linking does not affect the color of the film as is the case with other cross-linked systems. That is, during cross-linking or subsequent to cross-linking it remains uniform in appearance, does not fade and does not change to other colors, i.e., it is colorfast.

Suitable colorants that may be used are set forth in the Colorants Chart, Modern Plastics Encyclopedia Vol. 47; No. 10A, October 1970, pp. 850–852, under the Thermoplastics, polyethylene-high density and polyethylene-low density, which charts are hereby incorporated by reference in their entirety in this application.

A laminate is then provided, having an attractively appearing lining surface particularly for a counter stiffener. The surface can be made to give the appearance of a grain leather. cloth, or a suede nonslip surface and can be of any color. The lining surface has excellent resistance to abrasion and wear caused by the constant rubbing of the heel and can also withstand without any appreciable distorting the heat necessary to soften it during the manufacture (thermoforming) or lasting process.

Having described my invention, what is claimed is:

1. A method of forming a laminate which comprises:
   (a) forming a thermoplastic base sheet from polyethylene or a copolymer of ethylene having a melt index of between about 0.3 to 10;
   (b) forming a cross-linkable liner sheet from a low density polyethylene and a vinyl silane, the sheet having an inner surface and an outer surface;
   (c) adding an ethylenically compatible coloring to the liner sheet;
   (d) embossing the liner sheet on the outer surface;
   (e) contacting the inner surface of the liner sheet and the base sheet;
   (f) laminating the liner sheet to the base sheet;
   (g) cross-linking subsequent to said lamination the vinyl silane with the polyethylene, the coloring added in step (c) remaining colorfast; and,
   (h) thermoforming the laminated sheet into a desired shape.

2. The method of claim 1 wherein the base sheet is formed from an olefinic ionomeric resin; and
   wherein the polymer for the liner sheet comprises polymers of ethylene and vinyl silane.

3. The method of claim which includes thermoforming the laminate to a desired shape.

4. The method of claim 1 which includes thermoforming the laminate into a counter stiffener.

5. The method of claim 1 wherein the cross-linking of the liner sheet includes:
   contacting the liner sheet with moisture at atmospheric pressure.

6. The method of claim 1 which includes adding a colorant in an amount of from 0.2 to 5% by weight of the blend of the liner sheet to the liner sheet prior to forming.

7. The method of claim 6 which includes embossing the liner sheet on its outer surface prior to laminating the liner sheet to the base sheet.

8. A laminate which comprises:
   a base sheet comprising a polyethylene or a copolymer of ethylene;
   a liner sheet laminated thereto, having a cross-linked silane to polyethylene or copolymer of ethylene, its outer surface being embossed and further including an entylenically compatible color incorporated therein which will remain colorfast during and subsequent to the cross-linking of the silane.

9. The laminate of claim 8 wherein the base sheet is an olefinic ionomeric resin.

* * * * *